United States Patent
You et al.

(10) Patent No.: US 10,415,610 B2
(45) Date of Patent: Sep. 17, 2019

(54) POSITIONING ERROR PREVENTION HOOP

(71) Applicant: Yueqing Dongbo Electromechanical Co., Ltd., Zhejiang (CN)

(72) Inventors: Yixian You, Zhejiang (CN); Hongbing Li, Zhejiang (CN)

(73) Assignee: Yueqing Dongbo Electromechanical Co., Ltd., Zhejiang (CN)

( * ) Notice: Subject to any disclaimer, the term of this patent is extended or adjusted under 35 U.S.C. 154(b) by 0 days.

(21) Appl. No.: 15/871,158

(22) Filed: Jan. 15, 2018

(65) Prior Publication Data

US 2019/0186514 A1 Jun. 20, 2019

(30) Foreign Application Priority Data

Dec. 20, 2017 (CN) .......................... 2017 1 1386711

(51) Int. Cl.
*F16B 2/08* (2006.01)
(52) U.S. Cl.
CPC ...................................... *F16B 2/08* (2013.01)
(58) Field of Classification Search
CPC .................................. F16B 2/08; F16L 33/025
See application file for complete search history.

(56) References Cited

U.S. PATENT DOCUMENTS

| | | | | |
|---|---|---|---|---|
| 2,641,038 A * | 6/1953 | Christophersen | ....... | F16L 33/02 24/278 |
| 3,389,442 A * | 6/1968 | Tetzlaff | ................... | F16L 33/10 24/278 |
| 3,407,448 A * | 10/1968 | Tetzlaff | ................... | F16L 33/10 24/19 |
| 4,724,583 A * | 2/1988 | Ojima | ................... | F16L 33/025 24/20 CW |
| 4,956,898 A * | 9/1990 | Miyamura | .............. | F16L 33/08 24/20 LS |
| 5,070,579 A * | 12/1991 | Hirabayashi | .......... | F16L 33/035 24/20 CW |
| 8,060,991 B2 * | 11/2011 | Ryhman | .................. | F16L 33/08 24/274 R |
| 2004/0207195 A1 * | 10/2004 | Bowater | ................. | F16L 33/08 285/23 |
| 2008/0098575 A1 * | 5/2008 | Krauss | .................... | F16L 33/08 24/279 |
| 2008/0282509 A1 * | 11/2008 | Fay | ........................ | F16L 33/025 24/19 |
| 2009/0235492 A1 * | 9/2009 | Streuli | .................. | F16L 33/025 24/19 |

(Continued)

FOREIGN PATENT DOCUMENTS

CN 105587935 11/2017

*Primary Examiner* — Robert Sandy
*Assistant Examiner* — David M Upchurch
(74) *Attorney, Agent, or Firm* — JCIPRNET

(57) ABSTRACT

A positioning error prevention hoop including a hoop body curled to form a sleeving area. After a limiting member is connected on the hoop body, a limiting block of the limiting member abuts against an end of a pipe to control a distance between the hoop body and an end surface of the pipe, such that the hoop body may be secured on an appropriate position. A fastening component is clamped to tighten the hoop body on the pipe. As such, the hoop body will not tend to fall off from the pipe and may also squeeze the pipe and fit it with a connecting piece to form sealing.

12 Claims, 14 Drawing Sheets

(56) References Cited

U.S. PATENT DOCUMENTS

| | | | |
|---|---|---|---|
| 2011/0005040 A1* | 1/2011 | Col | F16L 33/08 24/16 R |
| 2015/0267848 A1* | 9/2015 | Zaharis | F16L 33/025 24/20 CW |
| 2017/0184235 A1* | 6/2017 | You | F16L 33/025 |

* cited by examiner

POSITIONING ERROR PREVENTION HOOP

CROSS-REFERENCE TO RELATED APPLICATION

This application claims the priority benefit of China application no. 201711386711.7 filed on Dec. 20, 2017. The entirety of the above-mentioned patent application is hereby incorporated by reference herein and made a part of this specification.

TECHNICAL FIELD

The present invention relates to a fastener, and more particularly to a positioning error prevention hoop.

BACKGROUND

The invention patent (granted publication number: CN105587935B) discloses a hoop as well as a manufacturing method and a use method thereof. In this invention, a clamping belt is curled to form an elliptical sleeving area so as to promote clamping on a pipe, thus enabling the hoop to be fixed on a pipe fitting in a convenient and effective manner and preventing it from rotating circumferentially on the pipe.

This hoop functions to achieve connection and sealing between a pipe and a connecting piece, and when the hoop is installed on the pipe, it is required to dispose a position having a certain distance from ends of the pipe. As such, when the hoop is tightened, the pipe fits with the connecting piece to form sealing at the position where the hoop is tightened. Meanwhile, as positions of the pipe at both ends of the hoop are not clamped by the hoop, the hoop, upon tightening, has a diameter smaller than that of two ends of the pipe, thereby preventing the hoop from coming off from the pipe. Nevertheless, the above invention has the following problem: the hoop is voluntarily movable on the pipe in the axial direction, which is thus difficult to be held on an appropriate position on the pipe.

SUMMARY OF THE INVENTION

It is an object of the present invention to provide a positioning error prevention hoop, which has the advantage of being conveniently fixed on an appropriate position on the pipe.

The above technical object of the present invention is accomplished through the following technical solution: a positioning error prevention hoop is provided, which comprises a hoop body curled to form a sleeving area, wherein a head section and a tail section of the hoop body overlap to form a superposed part, the head section of the hoop body at the superposed part is an outer-side belt body, the tail section is an inner-side belt body, one of the inner-side belt body and the outer-side belt body is provided thereon with a clamping notch, the other belt body is correspondingly provided thereon with a clamping piece that may be snapped into the clamping notch, the outer-side belt body is provided thereon with a fastening component, the hoop body is provided thereon with a limiting member in a clamping manner, and a limiting block extending in a direction facing an inner side of the hoop body is disposed on a side of the limiting member that is remote from the hoop body.

With the adoption of the above technical solution, after the limiting member is connected to the hoop body, the limiting block of the limiting member abuts against an end of the pipe to control the distance between the hoop body and the end surface of the pipe, such that the hoop body can be fixed on an appropriate position. A fastening component is clamped at this position to tighten the hoop body on the pipe. As such, the hoop body will not tend to fall off from the pipe and may also squeeze the pipe and fit it with a connecting piece to form sealing.

The present invention is further disclosed as follows: the limiting member is a clamping block, an inner side of the clamping block is provided with a through slot penetrating through two opposite side walls of the clamping block, and the hoop body is clamped within the through slot; the limiting block is located at an end on the side of the clamping block that is remote from the hoop body.

With the adoption of the above technical solution, a through slot is used to achieve fixing on the hoop body, such that the limiting member can be conveniently installed on the hoop body, and after the hoop body is tightened to be fixed on the pipe, the limiting member may be removed for recycling.

The present invention is further disclosed as follows: the two side walls of the through slot slope, in the direction along which the two side walls get close to each other, from a slot bottom to a slot opening.

With the adoption of the above technical solution, the two side walls of the through slot slope face to face from the slot bottom to the slot opening, such that when the limiting member is fixed on the hoop body, the narrowed-down slot opening is used to limit accidental separation of the hoop body from the limiting member.

The present invention is further disclosed as follows: the inner side of the clamping block abuts against the pipe before the hoop body is fully tightened on the pipe.

With the adoption of the above technical solution, when the fastening component is clamped to tighten the hoop body, with the tight fitness of the pipe and the hoop body, squeezing occurs between the pipe and positions of the limiting member at both sides of the slot opening of the through slot because positions of the pipe at both ends of the hoop body have a diameter greater than the internal diameter of the sleeving area, and thus, under the action of squeezing, the limiting member falls off from the hoop body. The limiting member will not stay on the hoop body unless the hoop body fails to be tightened or no distance is allowed between the hoop and ends of the pipe. In the above two cases, an installer is required to check the hoop and to tighten the hoop body or reinstall the hoop depending on the circumstances.

The present invention is further disclosed as follows: the sleeving area is in the shape of an oval, wherein a minor axis of the oval is shorter than a diameter of the pipe, and a major axis of the oval is longer than the diameter of the pipe.

With the adoption of the above technical solution, when the pipe passes through the sleeving area, squeezing occurs between the sleeving area and an outer wall of the pipe in the minor axis direction, such that the pipe will not tend to rotate circumferentially.

The present invention is further disclosed as follows: rounded transition is formed between the two side walls of the through slot and the inner side of the clamping block.

With the adoption of the above technical solution, disposing rounded transition between the side walls of the through slot and the clamping block makes it easier for the clamping block to be snapped onto the hoop in a rounded manner, which also makes it more convenient to combine the limiting member and the hoop.

The present invention is further disclosed as follows: an outer side surface of the clamping block is spherical.

With the adoption of the above technical solution, disposing the outer surface of the clamping block to be spherical enables the outer surface of the clamping block to be free of sharp portions, thus avoiding the occurrence of hand injury.

The present invention is further disclosed as follows: the sleeving area is circular, and the clamping block abuts against a side wall of the pipe after the pipe passes through the sleeving area.

With the adoption of the above technical solution, the sleeving area is disposed to be circular, the clamping block is made to abut against the side wall of the pipe so as to limit circumferential rotation between the limiting block and the pipe, and the limiting block is also made to tightly abut against the hoop body. All this serves to limit circumferential rotation between the hoop body and the pipe. When the fastening component is clamped to tighten the hoop body, with the tight fitness of the pipe and the hoop body, squeezing occurs between the pipe and positions of the limiting member at both sides of the slot opening of the through slot because positions of the pipe at both ends of the hoop body have a diameter greater than the internal diameter of the sleeving area, and thus, under the action of squeezing, the limiting member falls off from the hoop body.

The present invention is further disclosed as follows: the limiting member is a snap ring having a notch, and two end portions of the snap ring respectively point to the fastening component and are close to the fastening component; upper and lower side edges of the snap ring are provided with clamping mechanisms for clamping the hoop body.

With the adoption of the above technical solution, the limiting member in the shape of a snap ring is disposed on the hoop body via the clamping mechanisms of the upper and lower side edges.

The present invention is further disclosed as follows: each of the clamping mechanisms is structured as follows: an arc-shaped pressing rib is disposed, in a direction facing the inner side of the hoop body, on a side edge of the snap ring that is opposite to the limiting block, a side of the limiting block that faces the arc-shaped pressing rib is provided with an abutment projection, and the abutment projection is disposed to be in abutting connection with an end surface opposite the hoop body; the hoop body is clamped between the abutment projection and the arc-shaped pressing rib.

With the adoption of the above technical solution, the arc-shaped pressing rib and the abutment projection are made to abut respectively against two end surfaces of the hoop body simultaneously so as to prevent the limiting member from moving axially relative to the hoop body. Owing to the employment of the abutment projection, a certain distance is left between ends of the pipe and the hoop when the limiting block abuts against the ends of the pipe.

The present invention is further disclosed as follows: the arc-shaped abutment rib abuts against the side wall of the pipe when the pipe passes through the sleeving area.

With the adoption of the above technical solution, the arc-shaped abutment rib is made to abut against the pipe so as to avoid circumferential rotation between the limiting member and the pipe.

The present invention is further disclosed as follows: the clamping notch is located on the outer-side belt body, the clamping piece is located within the inner-side belt body, and the snap ring is provided thereon with a sidestepping aperture for the clamping piece to pass therethrough.

With the adoption of the above technical solution, the clamping piece is made to pass through the sidestepping aperture so as to limit circumferential rotation between the hoop body and the limiting member, which, eventually, leads to limitations on the relative circumferential rotation between the hoop body and the pipe.

The present invention is further disclosed as follows: at least two limiting blocks are disposed, in the direction facing the inner side of the hoop body, on a side edge of the snap ring in a spaced manner.

With the adoption of the above technical solution, at least two limiting blocks are disposed, which allows a plurality of abutment points to be disposed between the limiting block and the end surface of the pipe, such that the hoop body will not slope or skew after its connection on the pipe.

The present invention is further disclosed as follows: each of the clamping mechanisms is structured as follows: positioning projections facing the inner side of the hoop body are disposed, in a spaced manner, on an end of the snap ring that is opposite to the limiting block; an arc-shaped pressing rib extends, in a direction facing the inner side of the hoop body, on a side edge of the snap ring that corresponds to the limiting block, and the limiting block is fixedly disposed on one side of the arc-shaped pressing rib that is remote from the positioning projections; the hoop body is clamped between each positioning projection and the arc-shaped pressing rib.

With the adoption of the above technical solution, the positioning projections and the arc-shaped pressing rib are employed to help limit the axial relative movement between the hoop body and the limiting member, such that when the limiting block abuts against ends of the pipe, the distance between the hoop body and the ends of the pipe is equal to the width of the arc-shaped pressing rib.

The present invention is further disclosed as follows: when the sleeving area receives the pipe passing therethrough, the arc-shaped pressing rib abuts against an outer wall of the pipe, and a gap is left between each positioning projection and the pipe.

With the adoption of the above technical solution, when the fastening component is clamped to tighten the hoop body, the hoop body, with its diameter being narrowed down, is separated from the limiting member. At this time, as there is only a small distance left between the position where the hoop body is tightened and ends of the pipe, the positions at the ends of the pipe will be correspondingly caused to deform towards the middle, such that the arc-shaped pressing rib is separated from the pipe. As the pipe is connected on a connecting piece having a diameter smaller than that of the pipe, the connecting piece will no longer be able to limit the limiting member from being disengaged after the arc-shaped pressing rib is separated from the pipe. At this time, the limiting member will automatically disengage and fall off from the pipe, thus playing a role in indicating whether the hoop body has been clamped.

The present invention is further disclosed as follows: at least two limiting blocks are disposed, in the direction facing the inner side of the hoop body, on a side edge of the snap ring in a spaced manner.

With the adoption of the above technical solution, at least two limiting blocks are disposed, which allows a plurality of abutment points to be disposed between the limiting block and the end surface of the pipe, such that the hoop body will not slope or skew after its connection on the pipe.

The present invention is further disclosed as follows: at least two positioning projections are provided.

With the adoption of the above technical solution, at least two positioning projections are disposed, which allows a plurality of abutment points to be disposed between the limiting block and the end surface of the pipe, such that the hoop body will not slope or skew after its connection on the pipe.

In conclusion, the present invention has the following beneficial effects:

1. After the limiting member is connected on the hoop body, the limiting block of the limiting member is made to abut against an end of the pipe so as to control the distance between the hoop body and an end surface of the pipe, such that the hoop body can be fixed on an appropriate position. The fastening component is clamped at this position to tighten the hoop body on the pipe, such that the hoop body will not tend to fall off from the pipe and may squeeze the pipe and fit it with the connecting piece to form sealing;

2. The limiting member will not stay on the hoop body unless the hoop body fails to be tightened or no distance is allowed between the hoop body and ends of the pipe. In the above two cases, an installer is required to check the hoop boy and to tighten or reinstall the hoop body depending on the circumstances. Therefore, the limiting member may also play a role in indicating whether the installation is successful.

DETAILED DESCRIPTION OF THE INVENTION

The present invention will be further illustrated in detail in combination with the accompanying drawings.

Embodiment 1

Figure 1:
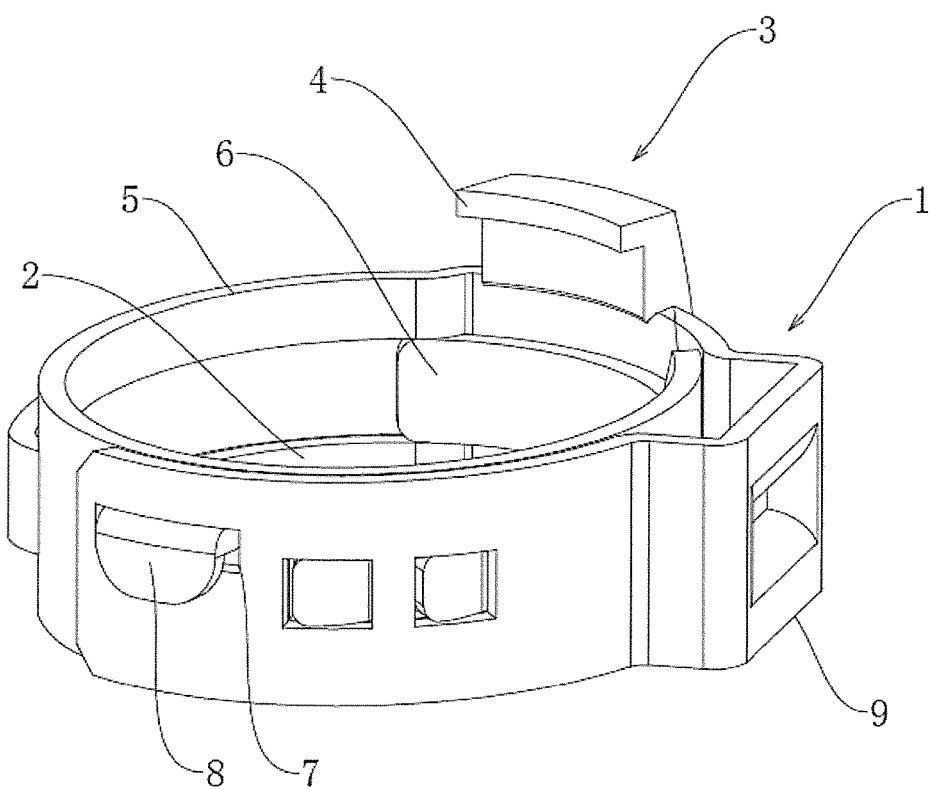
FIG. 1 is a schematic diagram illustrating the structure of Embodiment 1.
Figure 2:
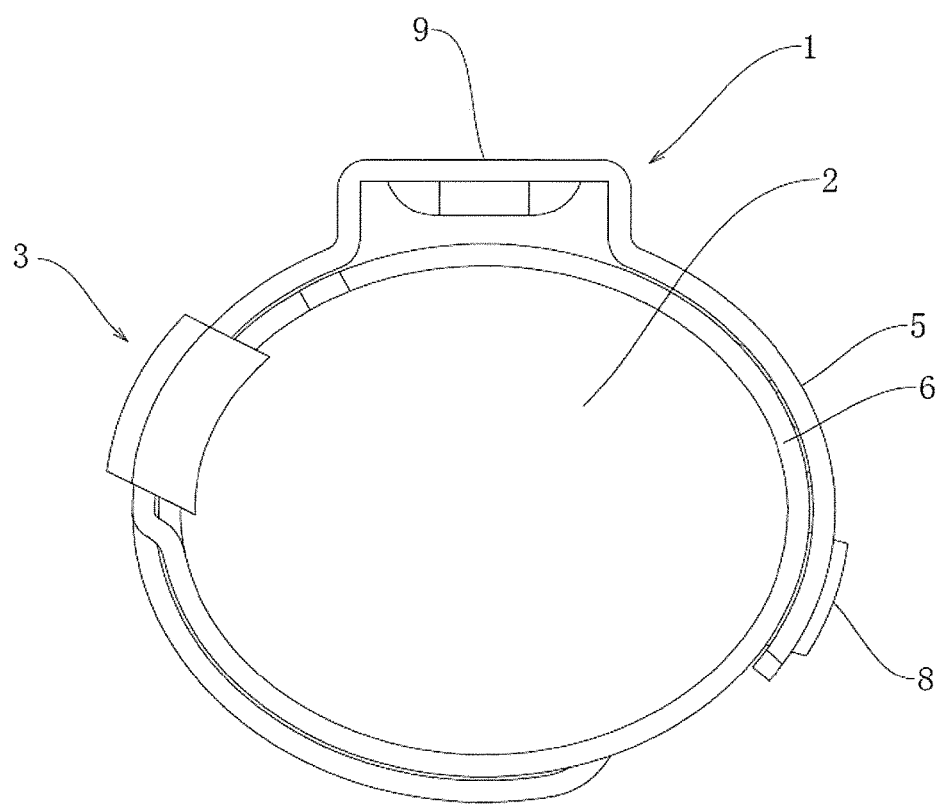
FIG. 2 is a schematic diagram illustrating the structure of Embodiment 1 viewed from another viewing point.

As shown in FIGS. 1 and 2, a positioning error prevention hoop is provided, which comprises a hoop body 1 curled to form a sleeving area 2 and a limiting member 3 located on the hoop body 1, and a limiting block 4 is formed at a position on the limiting member 3 that has a certain distance from the hoop body 1. When the positioning error prevention hoop is sleeved on the pipe, the limiting block 4 is made to fit with an end surface of the pipe to fix the positioning error prevention hoop at the position having a certain distance from the end surface of the pipe.

As shown in FIG. 1, a head section and a tail section of the hoop body 1 overlap to form a superposed part comprising an outer-side belt body 5 and an inner-side belt body 6, the outer-side belt body 5 is provided thereon with a clamping notch 7, and a clamping piece 8 that fits the clamping notch 7 is formed on the inner-side belt body 6. (It needs to be illustrated here that it could also be the case that the clamping notch 7 is disposed on the inner-side belt body 6, while the clamping piece 8 is disposed on the outer-side belt body 5. However, it should be noted that when the clamping piece 8 is disposed on the outer-side belt body 5, the clamping notch 7 on the inner-side belt body 6 should be disposed as a blind hole. As such, the clamping piece 8 on the outer-side belt body 5 is prevented from penetrating through the clamping notch 7 on the inner-side belt body 6 to be in direct contact with the pipe fitting). The outer-side belt body 5 is formed into a fastening component 9 by a U-shaped structure arching from inside-out.

As shown in FIG. 2, the sleeving area 2 is in the shape of an oval, wherein a minor axis length of the oval is slightly shorter than a diameter of the pipe, while a major axis length of the oval is slightly longer than the diameter of the pipe. When the pipe passes through the sleeving area 2, squeezing occurs between the sleeving area and an outer wall of the pipe in the minor axis direction, such that the pipe will not tend to rotate circumferentially.

Figure 3:
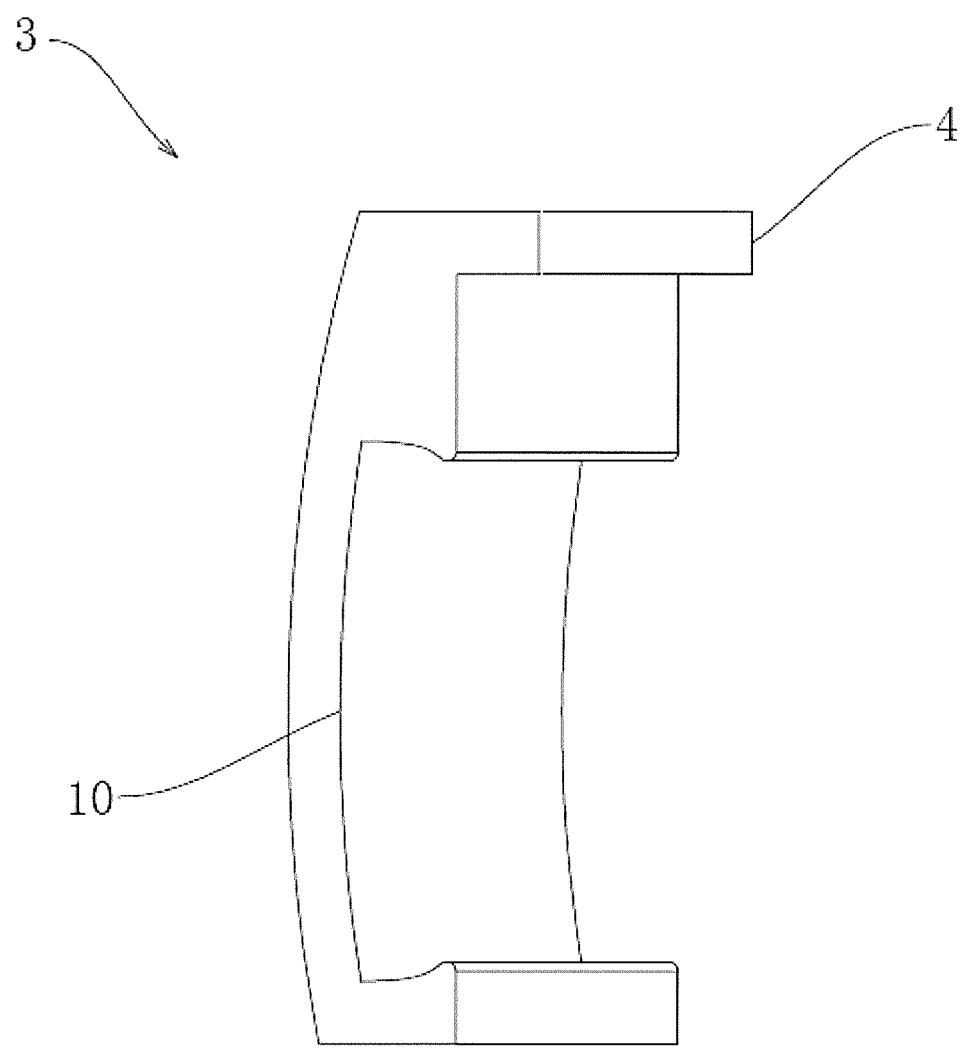
FIG. 3 is a schematic diagram illustrating the structure of a limiting member in Embodiment 1.

As shown in FIG. 3, the limiting member 3 is a clamping block, an inner side of the clamping block is provided with a through slot 10 penetrating through two opposite side walls of the clamping block, and the two side walls of the through slot 10 slope, in the direction along which the two side walls get close to each other, from a slot bottom to a slot opening. Rounded transition is formed between the two side walls of the through slot 10 and the inner side of the clamping block so as to prevent the clamping block from being damaged during its disassembly and assembly. As such, the clamping block may be recycled. An outer side surface of the clamping block is spherical.

Figure 4:
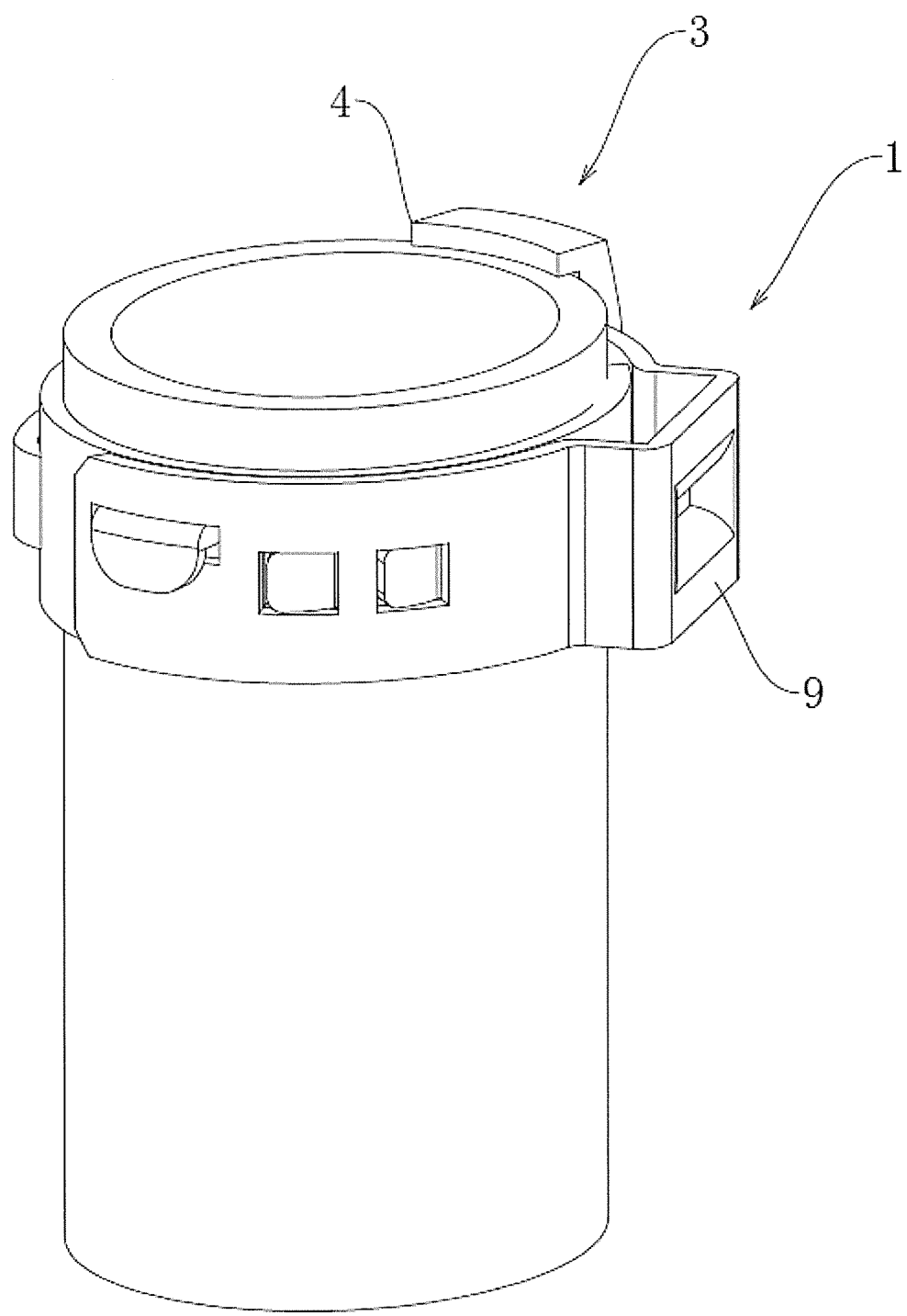
FIG. 4 is a schematic diagram illustrating the structure of Embodiment 1 fitted with a pipe.

As shown in FIGS. 1 and 4, when the clamping block passes through the through slot 10 to be clamped on the outer-side belt body 5, the inner side of the clamping block is flush with the inner surface of the inner-side belt body 6, such that the pipe will not be hindered by the clamping block when passing through the sleeving area 2. Meanwhile, when the fastening component 9 is clamped to tighten the hoop body 1, with the tight fitness of the pipe and the hoop body 1, squeezing occurs between the pipe and positions of the clamping block at both sides of the slot opening of the through slot 10 (shown in FIG. 3) because positions of the pipe at both ends of the hoop body 1 have a diameter greater than the internal diameter of the sleeving area 2, and thus, under the action of squeezing, the clamping block falls off from the hoop body 1. As it has been tightened and fixed at this time, the hoop body 1 will not be subjected to dislocation after the clamping block falls off, and the fallen-off clamping block may be collected for recycling. Meanwhile, as the clamping block falls off after the hoop body 1 is clamped, it may also play a role in indicating whether the hoop body 1 has been clamped.

Embodiment 2

Figure 5:
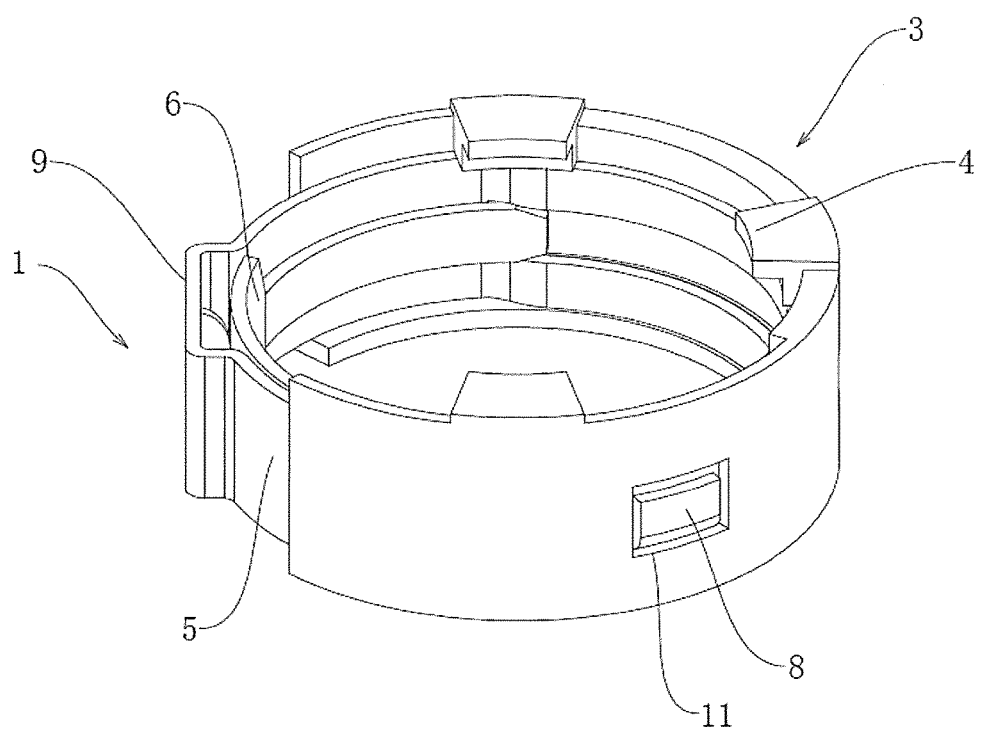
FIG. 5 is a schematic diagram illustrating the structure of Embodiment 2.
Figure 6:
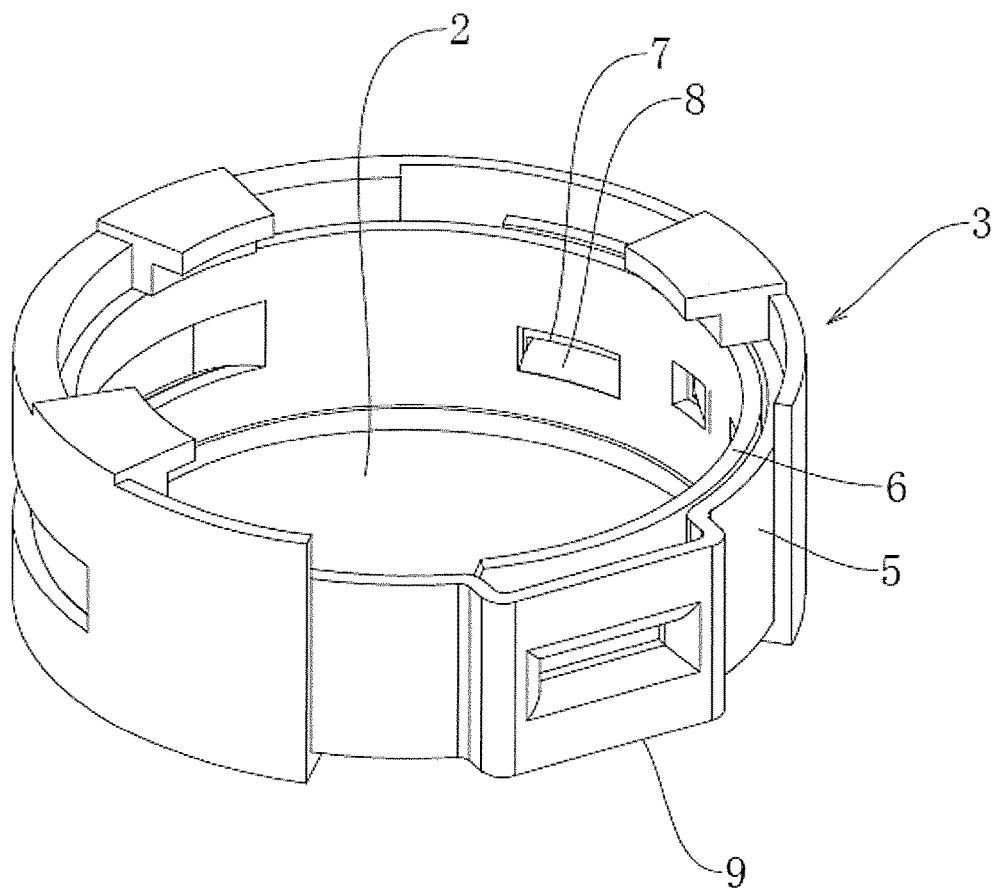
FIG. 6 is a schematic diagram illustrating the structure of Embodiment 2 viewed from another viewing point.

As shown in FIGS. 5 and 6, a positioning error prevention hoop is provided, which is distinguished from that in Embodiment 1 only in the following aspects: a sleeving area 2 is circular, a clamping notch 7 can only be disposed on an outer-side belt body 5, a clamping piece 8 that fits the clamping notch 7 is formed on an inner-side belt body 6, and the clamping piece 8 passes through the clamping notch 7.

Figure 7:
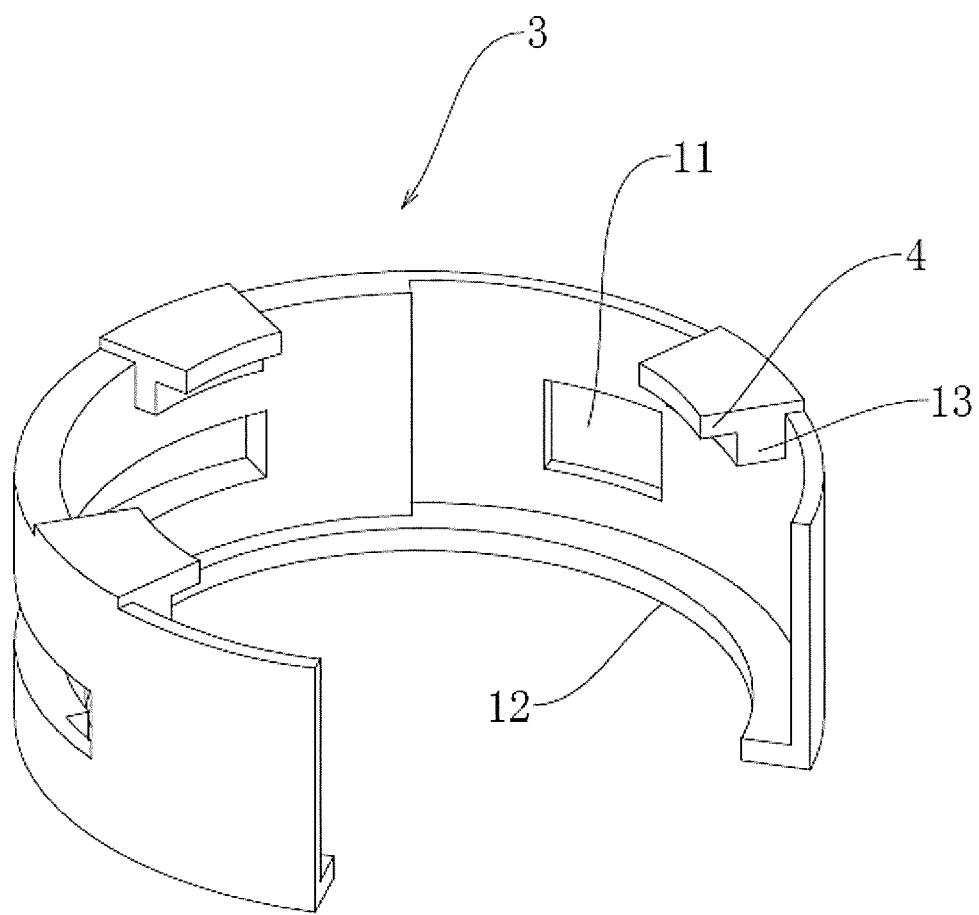
FIG. 7 is a schematic diagram illustrating the structure of a limiting member in Embodiment 2.

As shown in FIGS. 5 and 7, a limiting member 3 is a snap ring having a notch, a side of the snap ring is provided thereon with a sidestepping aperture 11 for giving way to the clamping piece 8 on the hoop body 1, an arc-shaped pressing rib 12 facing towards the center is formed on one end of the snap ring, and the arc-shaped pressing rib 12 is arranged to be in an interference fit with a pipe when disposed on the outside of the pipe. There are three limiting blocks 4 in total, which are located at another end of the snap ring. An abutment projection 13 is formed, along a direction in which each limiting block 4 is directed to the arc-shaped pressing rib 12, on an inner side of the snap ring, and the top end surface of the abutment projection 13 is flush with the inner surface of the inner-side belt body 6. When the snap ring is installed on the hoop body 1, the arc-shaped pressing rib 12 and the abutment projection 13 are made to abut respectively against two end surfaces of the hoop body 1 so as to prevent the snap ring from moving axially relative to the hoop body 1, and the clamping piece 8 is made to pass through the sidestepping aperture 11 so as to prevent circumferential rotation from occurring between the hoop body 1 and the snap ring.

Figure 8:
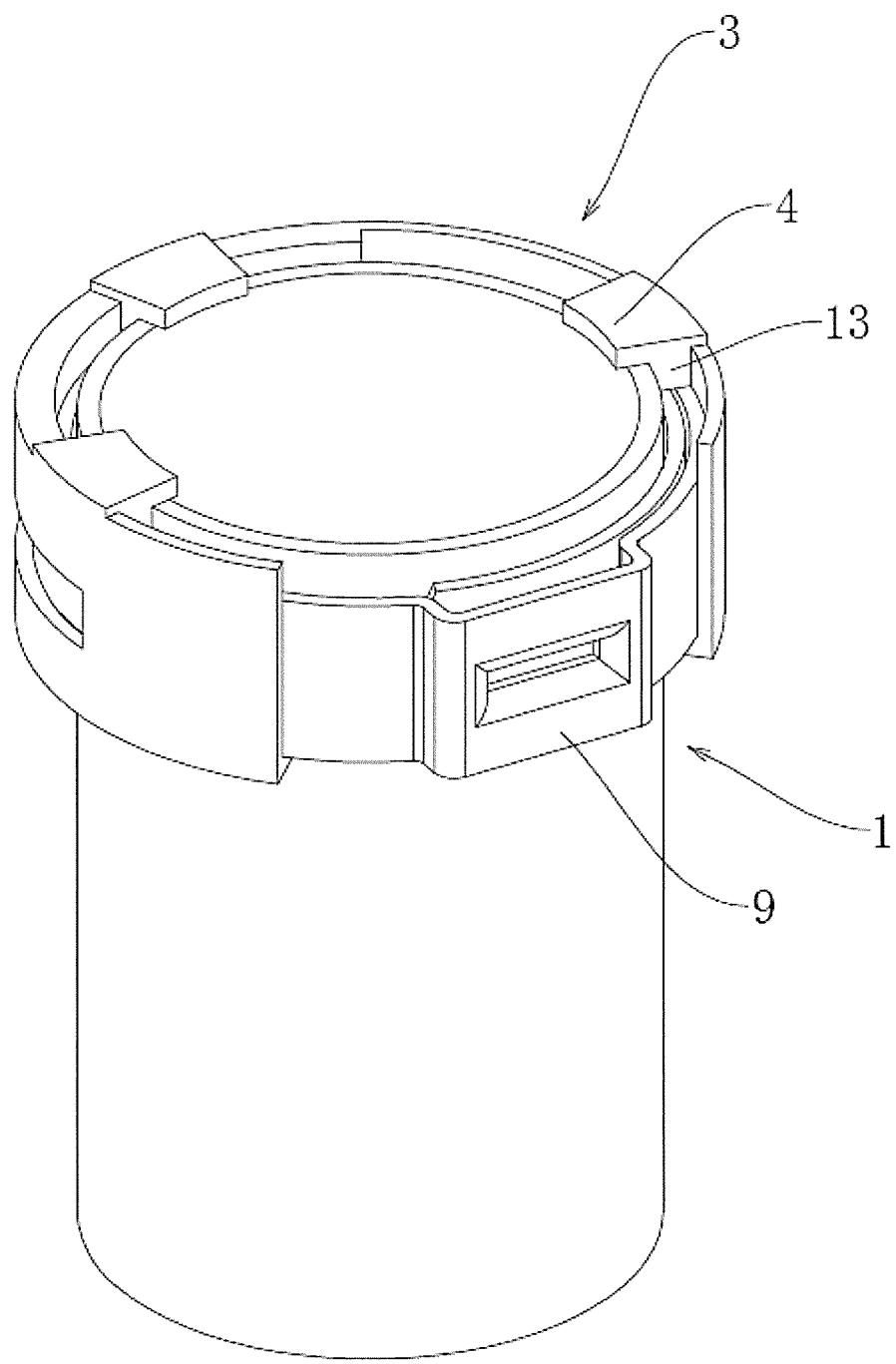
FIG. 8 is a schematic diagram illustrating the structure of Embodiment 2 fitted with a pipe.

As shown in FIGS. 6-8, the pipe passes through the sleeving area 2, the arc-shaped pressing rib 12 is arranged to be in an interference fit with the inner wall of the pipe to prevent circumferential rotation from occurring between the snap ring and the pipe, and the limiting block 4 abuts against one end of the pipe to make the distance between the hoop body 1 and the end surface of the pipe equal to the width of the abutment projection 13. After a fastening component 9 is clamped to have the hoop body 1 shrunk and fixed on the surface of the pipe, the hoop body 1, with its diameter being narrowed down, is separated from the snap ring. As such, the snap ring can be withdrawn in a direction facing ends of the pipe.

Embodiment 3

Figure 9:
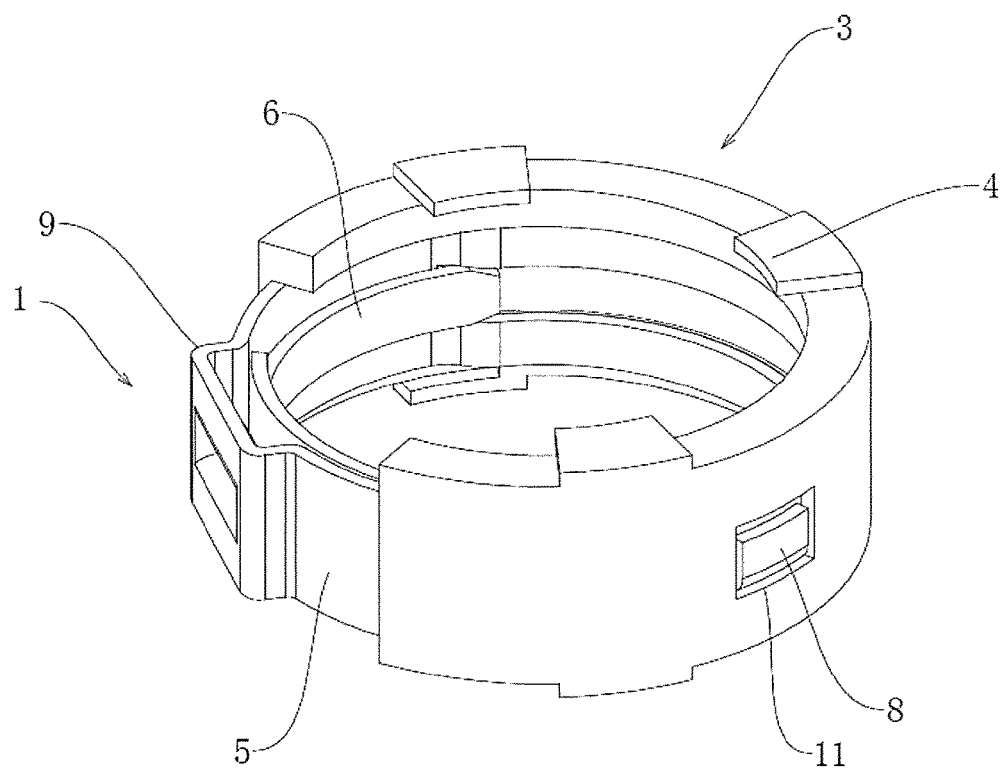
FIG. 9 is a schematic diagram illustrating the structure of Embodiment 3.
Figure 10:
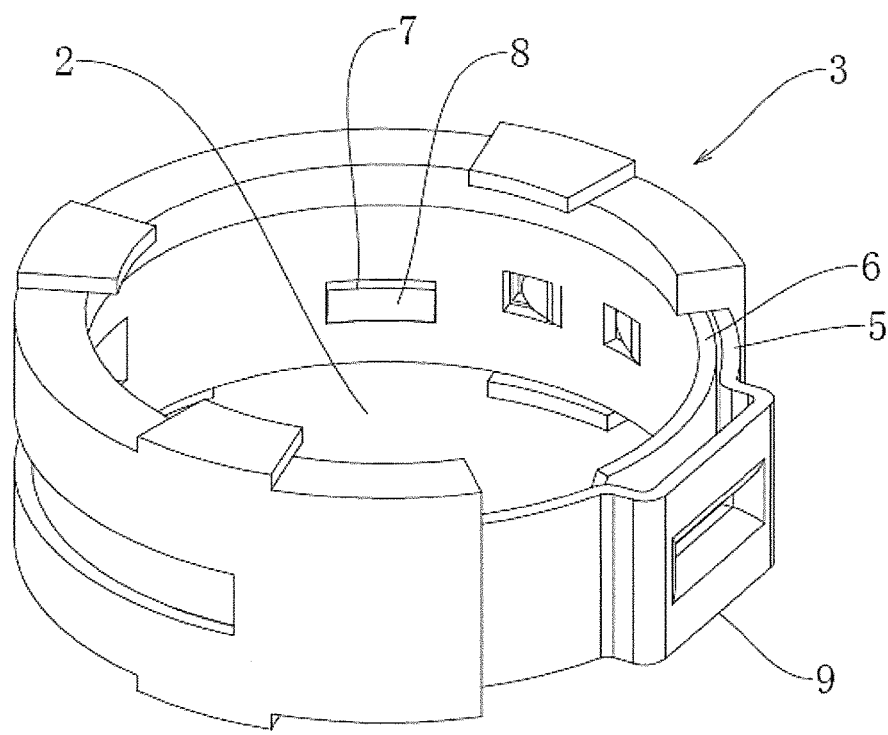
FIG. 10 is a schematic diagram illustrating the structure of Embodiment 3 viewed from another viewing point.

As shown in FIGS. 9 and 10, a positioning error prevention hoop is provided, which is distinguished from that in Embodiment 1 only in the following aspects: a sleeving area 2 is circular, a clamping notch 7 can only be disposed on an outer-side belt body 5, a clamping piece 8 that fits the clamping notch 7 is formed on an inner-side belt body 6, and the clamping piece 8 passes through the clamping notch 7.

Figure 11:
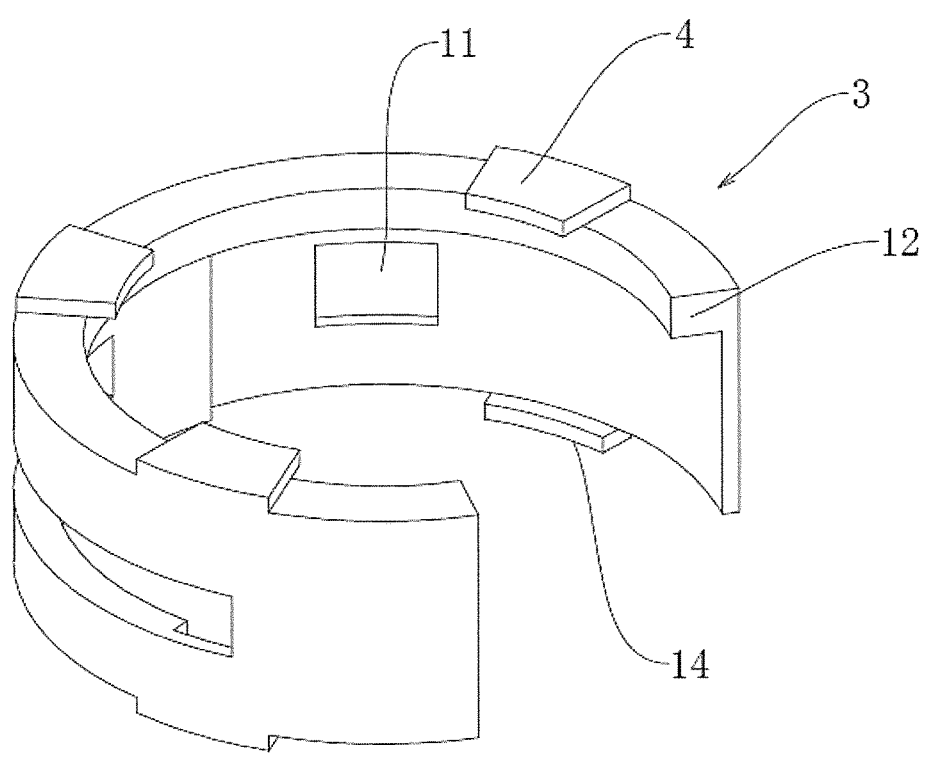
FIG. 11 is a schematic diagram illustrating the structure of a limiting member in Embodiment 3.

As shown in FIGS. 9 and 11, a limiting member 3 is a snap ring having a notch, and a side of the snap ring is provided thereon with a sidestepping aperture 11 for giving way to the clamping piece 8 on the hoop body 1. A positioning projection 14 facing towards the center is formed on one end of the snap ring, and when the snap ring is combined with the hoop body 1, the top end surface of this positioning projection 14 is flush with the inner surface of the inner-side belt body 6. An arc-shaped pressing rib 12 facing towards the center is formed on another end of the snap ring, and the arc-shaped pressing rib 12 is arranged to be in an interference fit with the pipe when it is sleeved on the outer side of the pipe. Limiting blocks 4 are three in number, which are located at the side of the arc-shaped pressing rib 12 that faces away from the positioning projection 14.

Figure 12:
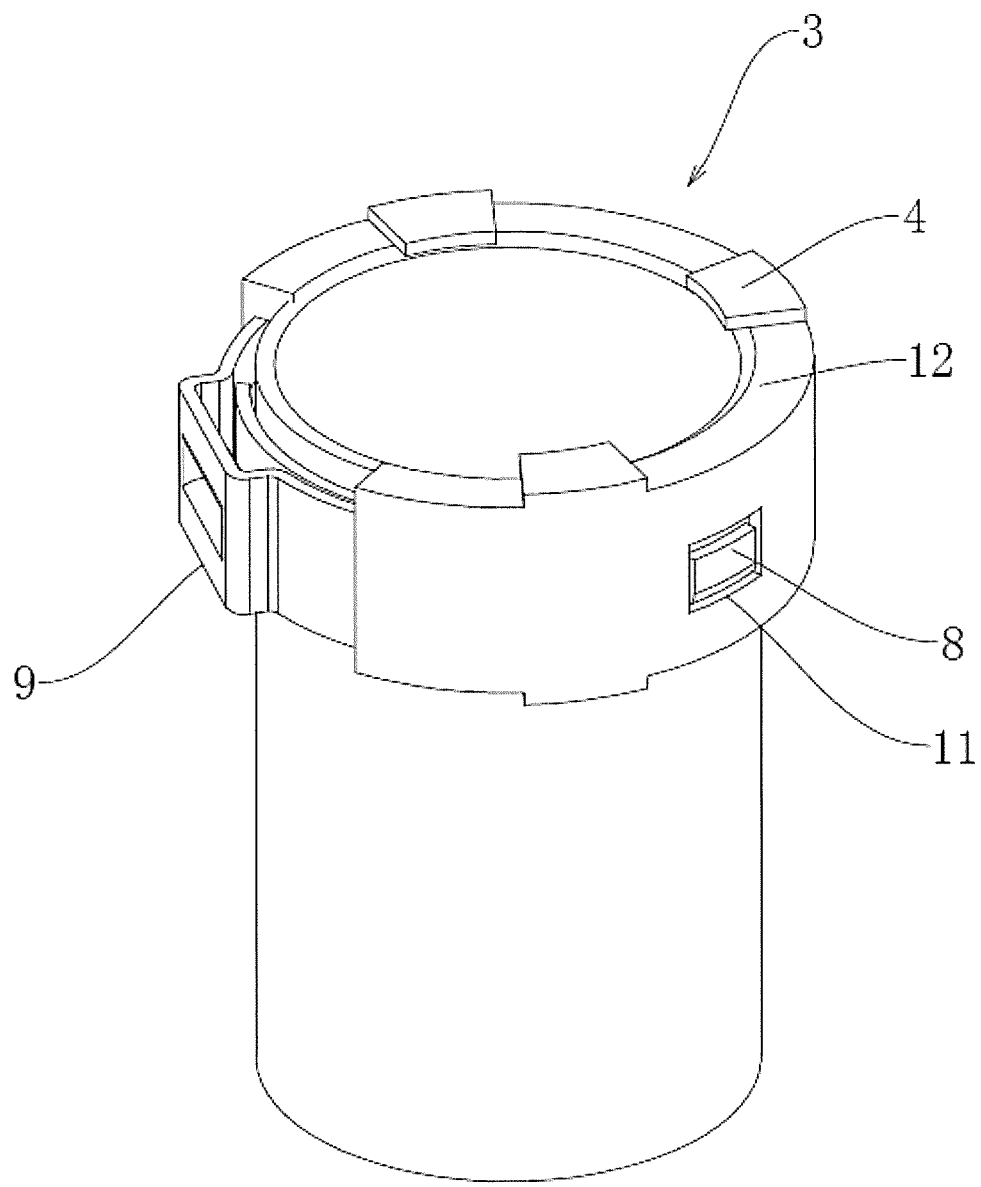
FIG. 12 is a schematic diagram illustrating the structure of Embodiment 3 fitted with a pipe.

As shown in FIGS. 10-12, the inner side of the positioning projection 14 is flush with the inner surface of the inner-side belt body 6, such that the pipe will not be hindered by the snap ring when passing through the sleeving area 2, and the pipe is arranged to be in an interference fit with the arc-shaped pressing rib 12 until it passes through the arc-shaped pressing rib 12. The hoop body 1 is limited from rotating circumferentially on the pipe. When the limiting block 4 abuts against the end face of the pipe, the hoop body 1 is limited from moving axially on the pipe, and at this time, the width of the arc-shaped pressing rib 12 is the distance between the hoop body 1 and the end surface of the pipe. When the fastening component 9 is clamped to tighten the hoop body 1, the hoop body 1, with its diameter being narrowed down, is separated from the snap ring. At this time, as there is only a small distance left between the position where the hoop body 1 is tightened and ends of the pipe, the positions at the ends of the pipe will be correspondingly caused to deform towards the middle, such that the arc-shaped pressing rib 12 is separated from the pipe. As the pipe is connected on a connecting piece having a diameter smaller than that of the pipe, the connecting piece will no longer be able to limit the snap ring from being disengaged after the arc-shaped pressing rib 12 is separated from the pipe. At this time, the snap ring will automatically disengage and fall off from the pipe, thus playing a role in indicating whether the hoop body 1 has been clamped.

Embodiment 4

Figure 13:
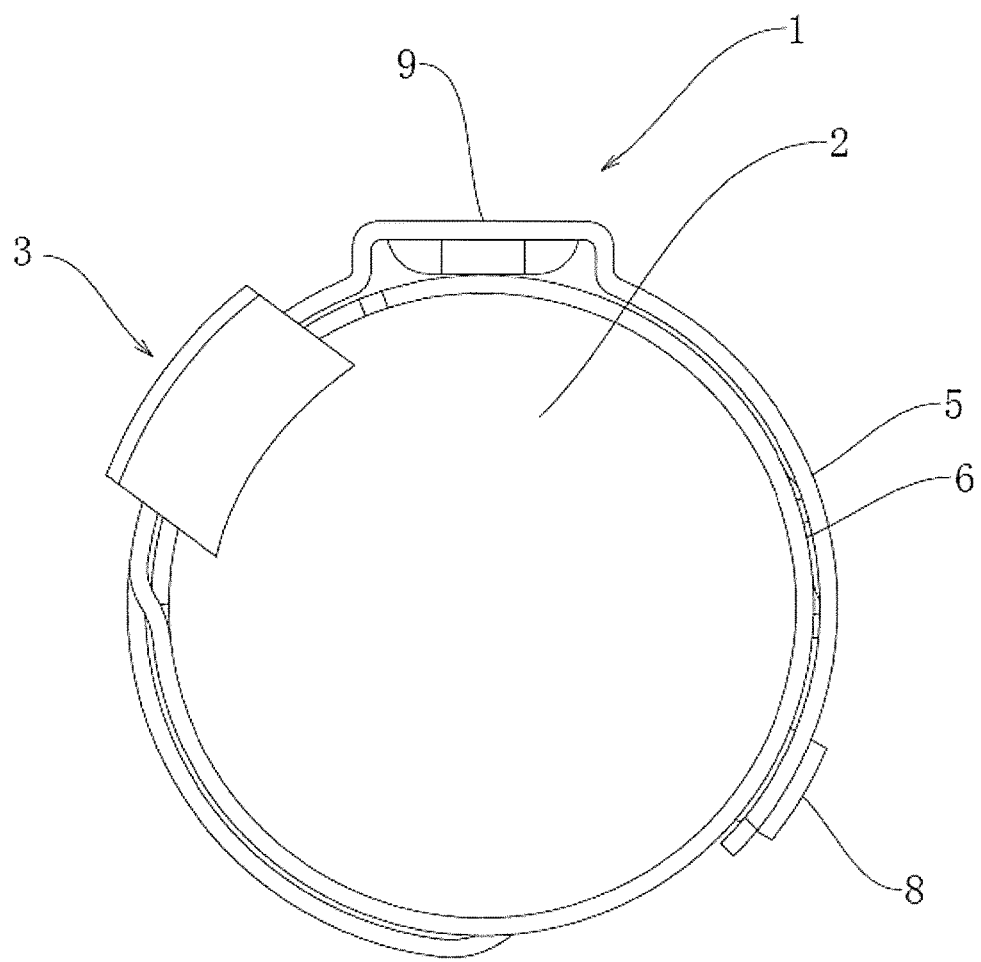
FIG. 13 is a top view of Embodiment 4.
Figure 14:
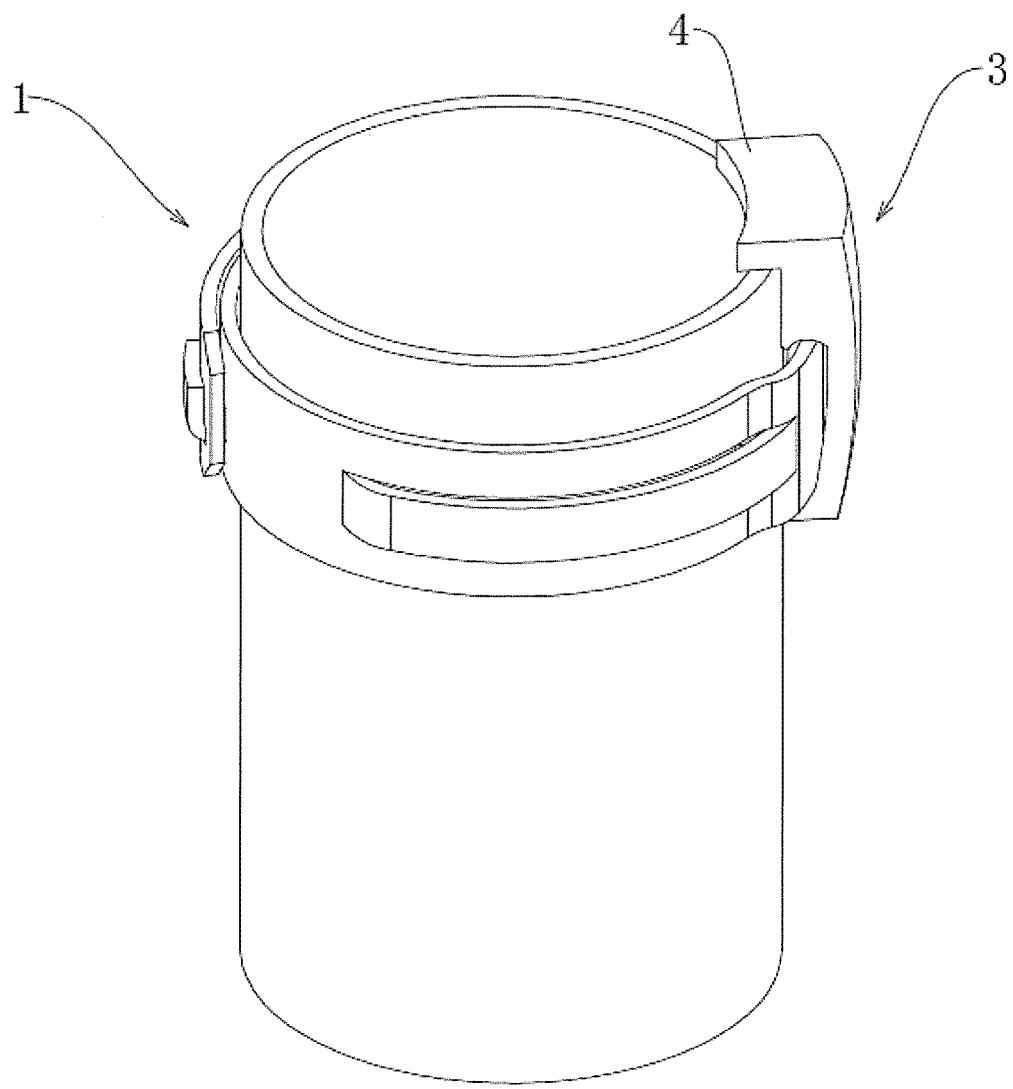
FIG. 14 is a schematic diagram illustrating the structure of Embodiment 4 fitted with a pipe.

As shown in FIGS. 13 and 14, a positioning error prevention hoop is provided, which is distinguished from that in Embodiment 1 in the following aspect: a sleeving area 2 is circular. After a pipe passes through the sleeving area 2, squeezing occurs between a side of a limiting member 3 and that of the pipe, thus limiting a hoop body 1 from rotating circumferentially. When a limiting block 4 abuts against an end surface of the pipe, the hoop body 1 is limited at a position having an appropriate distance from the end surface of the pipe. When a fastening component 9 is clamped to tighten the hoop body 1, with the tight fitness of the pipe and the hoop body 1, squeezing occurs between the pipe and positions of a clamping block at both sides of a slot opening of a through slot 10 (shown in FIG. 3) because positions of the pipe at both ends of the hoop body 1 have a diameter greater than the internal diameter of the sleeving area 2, and thus, under the action of squeezing, the clamping block falls off from the hoop body 1. As it has been tightened and fixed at this time, the hoop body 1 will not be subjected to dislocation after the clamping block falls off.

Specified directions in the present specific embodiments are merely for the purposes of helping describe relationships of positions and fittings among various components. The present specific embodiments are merely illustrative of the present invention, and not intended to constitute any limitations thereto. Upon reading the present description, those skilled in the art may make modifications without inventive contributions to the present embodiments according to requirements, but all of the modifications that fall within the scope of the claims of the present invention shall be protected by the Patent Law.

What is claimed is:

1. A positioning error prevention hoop, comprising a hoop body curled to form a sleeving area, wherein a head section and a tail section of the hoop body overlap to form a superposed part, the head section of the hoop body at the superposed part is an outer-side belt body, the tail section is an inner-side belt body, one of the inner-side belt body and the outer-side belt body is provided thereon with a clamping notch, the other one of the inner-side belt body and the outer-side belt body is correspondingly provided thereon with a clamping piece that may be snapped into the clamping notch, the outer-side belt body is provided thereon with a fastening component, the hoop body is provided thereon with a limiting member in a clamping manner, and a limiting block extending in a direction facing an inner side of the hoop body is disposed on a side of the limiting member that is remote from the hoop body;
  wherein the limiting member is a clamping block, an inner side of the clamping block is provided with a through slot penetrating through two opposite side walls of the clamping block, the hoop body is clamped within the through slot, and the limiting block is located at an end on a side of the clamping block that is remote from the hoop body;
  two side walls of the through slot slope from a slot bottom to a slot opening, in a direction along which the two side walls get close to each other; and
  the inner side of the clamping block abuts against a pipe before the hoop body is fully tightened on the pipe; and the hoop body is positioned between the clamping block and the pipe.

2. The positioning error prevention hoop of claim 1, wherein the sleeving area is in a shape of an oval, a minor axis of the oval is shorter than a diameter of the pipe, and a major axis of the oval is longer than the diameter of the pipe.

3. The positioning error prevention hoop of claim 2, wherein a rounded transition is formed between the two side walls of the through slot and the inner side of the clamping block.

4. The positioning error prevention hoop of claim 3, wherein an outer side surface of the clamping block is spherical.

5. The positioning error prevention hoop of claim 1, wherein the sleeving area is circular, and the clamping block abuts against a side wall of a pipe after the pipe passes through the sleeving area.

6. A positioning error prevention hoop, comprising a hoop body curled to form a sleeving area, wherein a head section and a tail section of the hoop body overlap to form a superposed part, the head section of the hoop body at the superposed part is an outer-side belt body, the tail section is an inner-side belt body, one of the inner-side belt body and the outer-side belt body is provided thereon with a clamping notch, the other one of the inner-side belt body and the outer-side belt body is correspondingly provided thereon with a clamping piece that may be snapped into the clamping notch, the outer-side belt body is provided thereon with a fastening component, the hoop body is provided thereon with a limiting member in a clamping manner, and a limiting block extending in a direction facing an inner side of the hoop body is disposed on a side of the limiting member that is remote from the hoop body;
  wherein the limiting member is a snap ring having a notch, two end portions of the snap ring respectively point to the fastening component and are close to the fastening component, and an upper side edge and a lower side edge of the snap ring are provided with clamping mechanisms for clamping the hoop body;
  each of the clamping mechanisms is structured as follows: an arc-shaped pressing rib is disposed on a side edge of the snap ring that is opposite to the limiting block in the direction facing the inner side of the hoop body, a side of the limiting block that faces the arc-shaped pressing rib is provided with an abutment projection, and the abutment projection is disposed to be in abutting connection with an end surface opposite the hoop body; and the hoop body is clamped between the abutment projection and the arc-shaped pressing rib; and
  the arc-shaped abutment rib abuts against the side wall of the pipe when the pipe passes through the sleeving area.

7. The positioning error prevention hoop of claim 6, wherein the clamping notch is located on the outer-side belt body, the clamping piece is located on the inner-side belt body, and the snap ring is provided thereon with a sidestepping aperture for the clamping piece to pass therethrough.

8. The positioning error prevention hoop of claim 6, wherein at least two limiting blocks are disposed on a side edge of the snap ring in a spaced manner, in the direction facing the inner side of the hoop body.

9. The positioning error prevention hoop of claim 6, wherein each of the clamping mechanisms is structured as follows: positioning projections facing the inner side of the hoop body are disposed on an end of the snap ring that is opposite to the limiting block, in a spaced manner, the arc-shaped pressing rib extends on a side edge of the snap ring that corresponds to the limiting block, in the direction facing the inner side of the hoop body, the limiting block is fixedly disposed on one side of the arc-shaped pressing rib that is remote from the positioning projections, and the hoop body is clamped between each of the positioning projections and the arc-shaped pressing rib.

10. The positioning error prevention hoop of claim 9, wherein when the sleeving area receives the pipe passing therethrough, the arc-shaped pressing rib abuts against an outer wall of the pipe, and a gap is left between each of the positioning projections and the pipe.

11. The positioning error prevention hoop of claim 9, wherein the at least two limiting blocks are disposed on the side edge of the snap ring in a spaced manner, in the direction facing the inner side of the hoop body.

12. The positioning error prevention hoop of claim 9, wherein at least two positioning projections are provided.

* * * * *